United States Patent [19]

Immer et al.

[11] 3,904,593

[45] Sept. 9, 1975

[54] PEPTIDE DERIVATIVES HAVING AN α-HYDRAZIDE LINKAGE AND PREPARATION THEREOF

[75] Inventors: Hans U. Immer, Montreal; Verner R. Nelson, Kirkland; Manfred K. Götz, Hudson, all of Canada

[73] Assignee: American Home Products Corporation, New York, N.Y.

[22] Filed: Feb. 7, 1973

[21] Appl. No.: 330,352

[52] U.S. Cl............................ 260/112.5; 424/177
[51] Int. Cl.² ................. C07C 103/52; A61K 37/00
[58] Field of Search ............................ 260/112.5

[56] References Cited
OTHER PUBLICATIONS

Bergmann et al., Chem. Abstr. 74:86230n (1971).
Oehme et al., Chem. Abstr. 74:62858x (1971).
Niedrich: Chem. Abstr. 67:117257p (1967).
Grupe et al., Chem. Abstr. 67:117258q (1967).

*Primary Examiner*—Lewis Gotts
*Assistant Examiner*—Reginald J. Suyat

[57] ABSTRACT

Peptide derivatives having an α-hydrazide linkage and methods for their preparation are disclosed. The derivatives are embodied by the hexapeptide derivatives H—Ala—Phe—N[N($R^1$)($R^2$)]$CHR^3$CO—Gly—Leu—Met—$NH_2$ and H—Ala—Phe—Val—Gly—N[N($R^1$)($R^2$)]$CHR^3$CONHCH($CH_2CH_2$3-)$CONH_2$ in which $R^1$ and $R^2$ are each lower alkyl and $R^3$ is an amino acid side chain. The hexapeptide derivatives possess hypotensive activity and methods for their use are given.

13 Claims, No Drawings

PEPTIDE DERIVATIVES HAVING AN α-HYDRAZIDE LINKAGE AND PREPARATION THEREOF

BACKGROUND OF THE INVENTION a. Field of Invention

This invention relates to peptide derivatives, to processes for preparing the same and to intermediates used for these preparations.

b. Description of the Prior Art

The main obstacle to the practical use of many biologically active peptides is their brief period of action which is partly due to their inactivation by proteolytic enzymes. An example of such a peptide is the undecapeptide, eledoisin.

Eledoisin is a powerful vasodilating and hypotensive undecapeptide isolated from the posterior salivary glands of *Eledone* (*moschata* and *Aldrovandi*). In 1961, V. Erspamer and A. Anastasi, Experientia, 18, 58 (1962), proposed the following structure for this peptide:

H—Pyr—Pro—Ser—Lys—Asp—Ala—Phe—Ileu—Gly—Leu—Met—$NH_2$

This structure was confirmed soon thereafter by total synthesis of the peptide by E. Sandrin and R. A. Boissonnas, Experientia, 18, 59 (1962).

Since the elucidation and confirmation of the structure of eledoisin, many analogs of this peptide have been synthesized in order to find a substance less prone to proteolysis. Although this goal apparently has not been achieved, one noteworthy finding is that the following hexapeptide derived from the last six amino acids portions of eledoisin retains 15 to 30% of the activity of the parent undecapeptide: Ala—Phe—Ileu—Gly—Leu—Met—$NH_2$.

Furthermore, the isoleucyl radical in the hexapeptide can be replaced with a valyl or a phenylalanyl radical without appreciable loss of activity. See, E. Schröder and K. Lübke, "The Peptides", Vol. 2, Academic Press, New York, 1965, pages 127–153.

Accordingly, analogs of this hexapeptide having a greater resistance to protease hydrolysis while retaining the hypotensive activity of the hexapeptide would be of interest.

Further in accordance with the above discussion the present invention discloses novel analogs of the aforementioned hexapeptide in which the isoleucyl radical is replaced with a valyl radical and in which an amide bond is substituted further with a dialkylamino group to form an α-hydrazide linkage therein.

In addition, an unique and straight-forward process for preparing these peptide derivatives having an α-hydrazide linkage is disclosed.

SUMMARY OF THE INVENTION

The peptide derivatives of this invention are represented by general formula 1

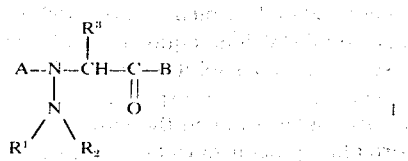

wherein A is the acyl component of an amino acid or peptide, B is the amino component of a second amino acid or peptide, $R^1$ and $R^2$ each are lower alkyl and $R^3$ is an amino acid side chain, i.e., that part of an amino acid exclusive of the —$CH(NH_2)COOH$ portion, as defined by K. D. Kopple, "Peptides and Amino Acids", W. A. Benjamin Inc., New York and Amsterdam, 1966, p. 33. Examples of such side chains are $(CH_3)_2CH$— (the side chain of valine), $(CH_3)_2CHCH_2$— (the side chain of leucine), $C_6H_5CH_2$— (the side chain of phenylalanine), 3-indolylmethylene (the side chain of tryptophan), and the like.

The process of this invention incorporates the condensation of a hydrazone of formula $R^1R^2NN=CHR^3$ in which $R^1$, $R^2$ and $R^3$ are as defined herein, with an acid of formula $R^4OH$ in which $R^4$ is the acyl component of an amino acid or peptide, in the presence of an isonitrile of formula $R^5NC$ in which $R^5$ is that portion of a lower alkyl ester of an amino acid or peptide exclusive of the amino group, to obtain an intermediate of formula 2

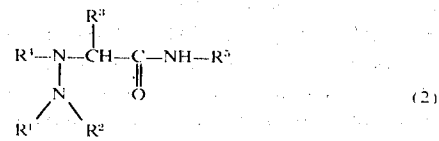

in which $R^1$, $R^2$, $R^3$, $R^4$ and $R^5$ are as defined herein, followed by transformation of the intermediate so obtained to the desired peptide derivatives of formula 1.

Preferred compounds of general formula 1 are embodied by those in which A is the acyl component H—Ala—Phe— and B is the amino portion —Gly—Leu—Met—$NH_2$ or A is the acyl component H—Ala—Phe—Val—Gly— and B is the amino portion —$NHCH(CH_2CH_2SCH_3)CONH_2$, and $R^1$, $R^2$ and $R^3$ are as defined hereinbefore.

The process utilized for preparing the preferred compounds of formula 1 incorporates the condensation of the aforementioned hydrazone of formula $R^1R^2NN=CHR^3$ in which $R^1$, $R^2$ and $R^3$ are as defined herein, with a N-protected acid of formula $R^4OH$ in which $R^4$ is N-(t-butoxycarbonyl)phenylalanyl (Boc—Phe—) in the presence of an isonitrile of formula $R^5NC$ in which $R^5$ is —$CH_2COOR^6$ wherein $R^6$ is a lower alkyl, or with a N-protected acid of formula $R^4OH$ in which $R^4$ is N-(t-butoxycarbonyl)glycyl (Boc—Gly—) in the presence of an isonitrile of formula $R^5NC$ in which $R^5$ is —$CH(CH_2CH_2SCH_3)COOR^6$ wherein $R^6$ is a lower alkyl, to obtain an intermediate of formula 2 in which $R^1$, $R^2$ and $R^3$ are as defined therein and $R^4$ is Boc—Phe—and $R^5$ is —$CH_2COOR^6$ as defined herein, or $R^4$ is Boc—Gly— and $R^5$ is —$CH(CH_2CH_2SCH_3)COOR^6$ as defined herein, respectively; followed, when $R^4$ and $R^5$ of the intermediare 2 is Boc-Phe-and-$CH_2COOR^6$ as defined herein, respectively, by treatment of the last said intermediate 2 with a hydrolyzing agent to obtain the corresponding acid of formula Boc—Phe—N[N($R^1$)($R^2$)]—CH-$R^3$—CONH$CH_2$COOH in which $R^1$, $R^2$ and $R^3$ are as defined herein; treating the acid with a reagent capable of transforming an amino or peptide acid to a corresponding activated ester, e.g. with p-nitrophenol in the presence of dicyclohexylcarbodiimide (DCC), to obtain the corresponding activated ester, for example, the p-nitrophenol ester; treating the latter compound with leucylmethioninamide (H-Leu-Met-NH$_2$) to obtain the corresponding protected pentapeptide derivative, Boc—Phe—N[N(R$^1$)(R$^2$)]CHR$^3$CO—Gly—Leu—Met—NH$_2$; treating the latter compound with a N-deprotecting agent to obtain the corresponding N-deprotected derivative of formula H—Phe—N[N(R$^1$)(R$^2$)]CHR$^3$CO—Gly—Leu—Met—NH$_2$; treating the latter compound with N-(t-butoxycarbonyl)alanine 2,4,5-trichlorophenol ester to obtain the protected hexapeptide derivative, Boc—Ala—Phe—N—[N(R$^1$)(R$^2$)]CHR$^3$CO—Gly—Leu—Met—NH$_2$; and treating the latter compound with a deprotecting agent to obtain the corresponding peptide derivative of formula 1; or followed, when R$^4$ and R$^5$ of the intermediate 2 is Boc—Gly— and —CH(CH$_2$CH$_2$SCH$_3$)COOR$^6$ as defined herein, respectively, by treatment of said intermediate 2 with ammonia to obtain the corresponding amide; treating the latter compound with a deprotecting agent to obtain the corresponding deprotected compound, H—Gly—N[N(R$^1$)(R$^2$)]—CHR-$^3$CO—NHCH(CH$_2$CH$_2$SCH$_3$)CONH$_2$; treating the latter compound with N—(t-butoxycarbonyl)alanylphenylalanylvaline (Boc—Ala—Phe—Val—OH) to obtain the corresponding protected hexapeptide derivative; and treating said last derivative with a deprotecting agent to obtain the corresponding peptide derivative of formula 1, H—Ala—Phe—Val—Gly—N[N(R$^1$)(R$^2$)]CHR$^3$CONHCH(CH$_2$CH$_2$SCH$_3$-)CONH$_2$.

DETAILED DESCRIPTION OF THE INVENTION

The term "lower alkyl" as used herein contemplates straight chain alkyl radicals containing from 1 to 6 carbon atoms and branched chain alkyl radicals containing 3 to 4 carbon atoms and includes methyl, ethyl, propyl, isopropyl, butyl, isobutyl, pentyl and the like.

The protective groups used in the process of this invention, their equivalents and the conventional abbreviations, used herein, by which they and the common amino acids are designated are described in standard textbooks; for example see Schröder and Lübke, cited above and K. D. Kopple, "Peptides and Amino Acids", W. A. Benjamin, Inc., New York, 1966. In keeping with these texts, a reference in the preferred embodiment described herein to an amino acid or its derived radical contemplates the L-form thereof unless preceded by a specific designation such as DL.

Examples of preferred amine protective groups (i.e. those which are acid sensitive) include t-butoxycarbonyl, benzyloxycarbonyl, p-nitrobenzoyloxycarbonyl, trityl and formyl, which are derived from the following respective preferred reagents for forming these groups: t-butoxycarbonyl azide, benzyloxycarbonyl chloride, p-nitrobenzoyloxycarbonyl chloride, trityl chloride, and formic acid. Other suitable amine protecting groups which can be preferentially cleaved include phthaloyl, tosyl, trifluoroacetyl and phenoxycarbonyl.

The term "acyl component" as used herein contemplates that part of an amino acid or peptide exclusive of the hydroxy portion of its carboxy group and includes phenylalanyl, glycylglycyl, alanylphenylalanyl and the like.

The term "amino component" as used herein contemplates that part of an amino acid or peptide or the corresponding ester or amide thereof, exclusive of a hydrogen on the amino group, which is α with respect to a carboxylic or ester group therein and includes —NHCH(CH$_3$)COOCH$_3$ (—Ala—OCH$_3$), —NHCH-$_2$CONHCH$_2$COOH (—Gly—Gly—OH), —NHCH-$_2$CONH$_2$ (—Gly—NH$_2$) and the like.

It will be noted that the structure of the compounds of this invention includes asymmetric carbon atoms. It is to be understood accordingly that the isomers arising from such asymmetry are included within the scope of this invention. Such isomers are obtained in substantially pure form by classical separation techniques and by sterically controlled synthesis.

The compound of formula 1 are capable of forming acid addition salts with pharamceutically acceptable acids. Such acid addition salts are included within the scope of this invention.

The acid addition salts are prepared by reacting the base form of the compound of formula 1 with substantially one or more equivalents, depending on the number of basic nitrogens in the compound, or preferably with an excess of the appropriate acid in an organic solvent, for example, an ethanol-ether mixture. Acid addition salts may also be obtained directly during the course of a deprotecting reaction as noted hereinafter. An acid addition salt prepared by any of the methods described above is converted, if desired, into a different acid addition salt, e.g. a salt with a pharmaceutically acceptable acid, by treatment with the appropriate ion exchange resin in the manner described by R. A. Boissonas et al., Helv. Chim Acta 43, 1349 (1960). Suitable ion exchange resins are strongly basic anion exchange resins, for example those listed in J. P. Greenstein and M. Winitz "Chemistry of the Amino Acids", John Wiley and Sons, Inc., New York and London, 1961, Vol. 2, p. 1456. Basically substituted cross-linked polystyrene resins such as Amberlite IRA-400 of IRA-410 are preferred.

These salts, when administered to mammals, possess the same pharmacologic activities as the corresponding bases.

For many purposes it is preferable to administer the salts rather than the base compounds. Among the acid addition salts suitable for this purpose are salts such as the sulfate, phosphate, lactate, tartrate, maleate, citrate, hydrobromide and hydrochloride. Both the base compounds and the salts have the distinct advantage of possessing a relatively low order of toxicity.

The compounds of formula 1 possess useful pharmacologic activity. For example, the compounds of formula 1, as well as their corresponding t-butoxycarbonyl derivatives, possesses hypotensive activity, which is demonstrable in standard pharmacologic tests. For example, the hypotensive effect can be shown in experiments performed in dogs anesthetized with a pentobarbital (20 mg/kg) -phenobarbital (60 mg/kg) mixture. Blood pressure and blood flow (electromagnetic flowmeter) are recorded in the femoral arteries. When the compounds of formula 1 are administered intravenously either with an equivalent amount of hydrochloric acid in aqueous solution or dissolved in 50% ethanol in the case of the corresponding t-butoxycarbonyl derivatives or in water in the case of the compounds of formula 1 at a concentration ranging from $5 \times 10^{-4}$ to $5 \times 10^{-3}$ w/v at doses ranging from 0.5 to 10 mcg/kg a hypotensive effect is observed. For example, in such a text alanylphenylalanyl[N-(dimethylamino)-DL-valyl]glycylleucylmethioninamide and its corresponding t-butoxycarbonyl derivative have a hypotensive effect with intensity and duration dependent on dose. The threshhold dose was 0.5 to 1 mcg/kg. After 10 mcg/kg the decrease in blood pressure amounted to 36 mm Hg and did not return to normal until after ten minutes. The blood flow was decreased 19% after the latter dose and the heart was slightly accelerated (10%).

When the compounds of formula 1 are employed for the purpose of inducing hypotension in warm blooded animals, for example, dogs, they are administered systemically, preferably parenterally, in combination with a pharmaceutically acceptable liquid or solid carrier. The proportion of the compound is determined by its solubility in the given carrier, by the given carrier, by the chosen route of administration, and by standard biological practice. For parenteral administration to animals the compound may be used in a sterile aqueous solution which may also contain other solutes such as buffers or preservatives, as well as sufficient pharmaceutically acceptable salts or glucose to make the solution isotonic. The dosage will vary with the form of administration and with the particular species of animal to be treated and is preferably kept at a level of from 5 mcg to 100 mcg per kilogram body weight. However, a dosage level in the range of from about 10 mcg to about 50 mcg per kilogram body weight is most desirably employed in order to achieve effective results.

The compounds of formula 1 may also be administered in one of the long acting, slow-release or depot dosage forms described below, preferably by intramuscular injection or by implantation. Such dosage forms are designed to release from about 0.5 mcg to about 50 mcg per kilogram body weight per day.

It is often desirable to administer the agent continuously over prolonged periods of time in long-acting, slow-release or depot dosage forms. Such dosage forms may either contain a pharmaceutically acceptable salt of the agent having a low degree of solubility in body fluids, for example one of those salts described below, or they may contain the agent in the form of a water-soluble salt together with a protective carrier which prevents rapid release. In the latter case, for example, the agent may be formulated with a non-antigenic partially hydrolyzed gelatin in the form of a viscous liquid; or the agent may be adsorbed on a pharmaceutically acceptable solid carrier, for example zinc hydroxide, and may be administered in suspension in a pharmaceutically acceptable liquid vehicle; or the agent may be formulated in gels or suspensions with a protective non-antigenic hydrocolloid, for example sodium carboxymethylcellulose, polyvinylpyrrolidone, sodium alginate, gelatine, polygalacturonic acids, for example, pectin, or certain mucopolysaccharides, together with aqueous or nonaqueous pharmaceutically acceptable liquid vehicles, preservatives, or surfactants. Examples of such formulations are found in standard pharmaceutical texts, e.g. in Remington's Pharmaceutical Sciences cited above. Long-acting, slow-release preparations of the agent produced according to the process of this invention may also be obtained by microencapsulation in a pharmaceutically acceptable coating material, for example gelatine, polyvinyl alcohol or ethyl cellulose. Further examples of coating materials and of the processes used for microencapsulation are described by J. A. Herbig in Encyclopedia of Chemical Technology, Vol. 13, 2nd Ed., Wiley, New York 1967, pp. 436–456. Such formulations, as well as suspensions of salts of the agent which are only sparingly soluble in body fluids, are designed to release from about 0.1 mcg to about 50 mcg of the active compound per kilogram body weight per day, and are preferably administered by intramuscular injection. Alternatively, some of the solid dosage forms listed above, for example certain sparingly water-soluble salts or dispersions in or adsorbates on solid carriers of salts of the agent, for example dispersions in a neutral hydrogel of a polymer of ethylene glycol methacrylate or similar monomers cross-linked as described in U.S. Pat. No. 3,551,556 may also be formulated in the form of pellets releasing about the same amounts as shown above and may be implanted subcutaneously or intramuscularly.

The process of this invention is illustrated by the following description of a preferred embodiment:

In the practise of this embodiment the requisite starting materials, the hydrazones of formula $R^1R^2NN=CHR^3$ in which $R^1$, $R^2$ and $R^3$ are as defined in the first instance are prepared by condensing an appropriately substituted hydrazine of formula $R^1R^2NNH_2$ in which $R^1$ and $R^2$ are as defined in the first instance, with an aldehyde of formula $R^3CHO$ in which $R^3$ is as defined in the first instance.

Hydrazines of formula $R^1R^2NNH_2$ are either known, for example, 1,1-dimethyl hydrazine, 1,1-diethyl hydrazine or 1,1-dipropyl hydrazine, or they are prepared by known methods, for example, see E. Müller in "Methoden der Organischen Chemie", Houben-Weyl, E. Müller, Ed., Vol. 10/2, Georg Thieme Verlag, Stuttgard, 1967, p. 50.

Likewise, the aldehydes of formula $R^3CHO$ are known and most are commercially available, for example, isobutyraldehyde and isovaleraldehyde, or are prepared by known methods; for example, see P. Karrer, "Organic Chemistry", 2nd. ed., Elsevier Publishing Co., Inc., New York, 1946, p. 149.

The condensation of the hydrazine of formula $R^1R^2NNH_2$ and the aldehyde of formula $R^3CHO$ is preferably carried out in an inert solvent at an elevated temperature, at or near the reflux temperature of the mixture. Either an anhydrous, water-immiscible hydrocarbon solvent, for example, benzene or toluene, with concomitant physical removal of water as it is being formed, for example, by means of a Dean-Stark water separator, or a lower alkanol solvent, for example, ethanol, propanol, or isopropanol may be employed. Thereafter, evaporation of the solvent and purification of the residue, for example by distillation or crystallization, yields the corresponding hydrazone of formula $R^1R^2NN=CHR^3$. Alternatively, the desired hydrazone may be prepared in situ during the course of the key reaction, see below.

The second requisite starting materials, the N-protected acids of formula $R^4OH$ are known. N-(t-butoxycarbonyl)phenylalanine and N-(t-butoxycarbonyl)glycine are described by G. R. Pettit, et al., Can. J. Chem. 45, 1561 (1967).

The third group of requisite starting materials, the isonitriles of formula $R^5NC$, are either known, namely, ethyl isocyanoacetate is described by R. Appel et al., Angew. Chem., Int. ed., 10 132 (1971) or are easily prepared by known methods, for example 2-isocyano-4-methylthiobutyric acid ethyl ester is obtained readily by methods described by P. Hoffmann, et al. in "Isonitrile Chemistry", Organic Chemistry, Vol. 20, I. Ugi, Ed., Academic Press, New York, 1971, p. 9.

Next, in a key reaction of the process of this invention the aforementioned hydrazone of formula $R^1R^2NN=CHR^3$ is condensed with the acid of formula $R^4OH$ and the isonitrile of formula $R^5NC$, described above, to yield the corresponding intermediate of formula 2.

Although not critical it is preferable to use approximately equimolar amounts of the three requisite starting materials for this condensation. The condensation is effected most conveniently in an inert solvent, for example, in halogenated hydrocarbons including methylene chloride, chloroform, and carbon tetrachloride, ethers and cyclic ethers including dioxane, diethyl ether and tetrahydrofuran, or lower aliphatic alcohols including methanol, ethanol and propanol. However, when the three starting materials are mutually soluble or the mixture thereof becomes liquid during the course of the condensation the solvent may be omitted without any deleterious effects.

The temperature and duration of the condensation also are not critical. The reaction may be performed at temperatures ranging from $-20°C$ to $100°C$; however, a range from $10°$ to $40°C$ is most convenient, with room temperature to the boiling point of the solvent employed being preferred. The reaction time may be varied and depends on the reactivity of the various starting materials; however, reaction times from 15 minutes to several days are employed generally, with 6 hours to 2 days being preferred.

Thereafter, the intermediate 2 in which $R^1$, $R^2$, $R^3$, $R^4$ and $R^5$ are as defined herein is isolated and purified according to standard procedures. For instance the product is extracted with a water-immiscible solvent and, if needed, purified by chromatography and crystallization.

The intermediate of formula 2 in which $R^1$, $R^2$ and $R^3$ are as defined herein and $R^4$ is Boc-Phe and $R^5$ is —CH$_2$COOR$^6$ as defined herein, obtained as described above, is transformed to the corresponding peptide derivative of formula 1 in the following manner:

If desired this intermediate is separated into two isomers. Chromatography on silica gel is a practical and convenient means for effecting this separation. For convenience, these two isomers are designated arbitrarily as isomers L and M. Thereafter either the separate isomers or the mixture thereof are transformed to the corresponding peptide derivatives of formula 1 in the manner disclosed hereinafter.

Said intermediate is treated with a hydrolyzing agent to obtain the corresponding acid of formula Boc—Phe—N[N(R$^1$)(R$^2$)]—CHR$^3$—CONHCH$_2$COOH in which R$^1$, R$^2$ and R$^3$ are as defined herein. Generally speaking, this hydrolysis is performed most conveniently by employing a base as the hydrolyzing agent, although hydrolysis with a suitable acid, for example, hydrochloric acid or sulfuric acid, is also applicable.

For basic hydrolysis a preferred method involves subjecting the lower alkyl ester to the action of a strong base, for example, sodium or potassium hydroxide, in the presence of sufficient water to effect hydrolysis of the ester. The hydrolysis is performed using a suitable solvent, for example, methanol or ethanol.

The reaction mixture is maintained at a temperature of from $0°C$ to the reflux temperature until hydrolysis occurs. Usually from 10 minutes to 16 hours is sufficient for this hydrolysis. The reaction mixture is then rendered acidic with an acid, for example, acetic acid, hydrochloric acid, sulfuric acid and the like, to obtain the corresponding acid of formula Boc—Phe—N[N(R$^1$)(R$^2$)]CHR$^3$—CONHCH$_2$COOH.

Next the preceding corresponding acid is treated with a reagent for transforming an amino or peptide acid to a corresponding activated ester to obtain the corresponding activated ester. In this case the preferred reagent is p-nitrophenol in the presence of DCC. Generally this reaction is effected by reacting the corresponding acid with approximately equimolar amounts of p-nitrophenol and DCC in an inert solvent, for example, ethyl acetate, dimethyl formamide, tetrahydrofuran or methylene chloride, at temperatures from $-20°$ to $20°C$, preferably $0°C$, and reaction times of from 1 to 24 hours, preferably 2 to 6 hours.

The activated ester is now treated with H—Leu—Met—NH$_2$ to obtain the corresponding protected pentapeptide derivative, Boc—Phe—N[N(R$^1$)(R$^2$)]CHR$^3$CO—Gly—Leu—Met—NH$_2$. Again this reaction is effected readily by allowing approximately equimolar amounts of the activated ester and H—Leu—Met—NH$_2$ to react in an inert solvent, for example, dimethyl formamide, diethyl acetamide or chloroform at $0°$ to $25°C$ for 2 to 24 hours.

Thereafter the preceding pentapeptide derivative is treated with a N-deprotecting agent to obtain the N-deprotected derivative of formula H—Phe—N[N(R$^1$)(R$^2$)]CHR$^3$CO—Gly—Leu—Met—NH$_2$ in which R$^1$, R$^2$, and R$^3$ are as defined herein. Examples of suitable deprotecting agents for this reaction include hydrochloric acid, trifluoroacetic acid, hydrobromic acid, hydrofluoric acid and the like. This deprotection is effected in an inert solvent, for example, methanol, ethanol or chloroform, which contains an excess of the deprotecting agent, for example, anhydrous hydrogen chloride. Alternatively, 2N hydrochloric acid in methanol or ethanol or excess trifluoroacetic acid without a solvent are used for this deprotecting reaction. Preferred reaction temperatures and times range from $0°$ to $20°C$ and 1 to 4 hours, respectively.

The N-deprotected derivative so obtained is treated with N-(t-butoxycarbonyl)alanine 2,4,5-trichlorophenyl ester to afford the corresponding protected hexapeptide. This reaction is performed in the same manner as described above for the treatment of the aforementioned activated ester with H—Leu—Met—NH$_2$; the preferred reaction temperature and time range from $0°$ to $10°C$ for 6 hours to 2 or 3 days.

Finally, treatment of the protected hexapeptide with a deprotecting agent in the same manner as described previously gives the corresponding peptide derivative of formula 1, H—Ala—Phe—N[N(R$^1$)(R$^2$)]CHR$^3$CO—Gly—Leu—Met—NH$_2$ in which R$^1$, R$^2$ and R$^3$ are as defined herein.

When it is desired to obtain the peptide derivative of formula 1 in which A is H—Ala—Phe—Val—Gly and B is —NHCH(CH$_2$CH$_2$SCH$_3$)—CONH$_2$, the corresponding intermediate of formula 2 in which R$^1$, R$^2$ and R$^3$ are as defined herein and R$^4$ is Boc—Gly— and R$^5$ is —CH(CH$_2$CH$_2$SCH$_3$)COOR$^6$ as defined herein, obtained as described above, is treated first with ammonia according to standard amidation methods to give the corresponding amide. Preferred conditions for this amidation include treating the said intermediate with a saturated solution of ammonia in an inert solvent, for example, methanol, ether or tetrahydrofuran at 0° to 20°C for 6 hours to 3 or 4 days.

If desired the preceding corresponding amide may be separated into two isomeric racemates at this stage. This separation is effected conveniently by chromatography on silica gel.

Next the corresponding amide is treated with a deprotecting agent, preferably trifluoroacetic acid in the manner described previously, to obtain the corresponding deprotected compound, H—Gly—N[N($R^1$)($R^2$)]CH$R^3$CO—NH—CH(CH$_2$CH$_2$SCH$_3$)CONH$_2$. In practising this present deprotecting reaction it is convenient to dissolve the amide in excess trifluoroacetic acid thereby allowing the excess trifluoroacetic acid to serve as the reaction solvent. After completion of the reaction, evaporation of the excess trifluoroacetic acid gives directly the aforementioned deprotected compound in the form of its acid addition salt with trifluoroacetic acid. Although the latter salt may be converted to its corresponding free base by standard means, it is much more expedient to add the salt directly to the following coupling reaction mixture with a concomitant amount of triethylamine to compensate for the trifluoroacetic acid portion of the salt. Likewise, the latter consideration applies if a saturated solution of hydrogen chloride is used for the deprotecting reaction. Indeed this latter consideration applies to all the deprotecting reactions of the present disclosure involving the removal of the t-butoxycarbonyl protecting group.

In the following coupling reaction, the preceding deprotected compound is treated with Boc—Ala—Phe—Val—OH to obtain the corresponding protected hexapeptide derivative, Boc—Ala—Phe—Va-Gly—N[N($R^1$)($R^2$)]CH$R^3$CO—NHCH(CH$_2$CH$_2$SCH$_3$)CONH$_2$. This coupling reaction is accomplished readily by reacting approximately equivalent amounts of the deprotected compound and Boc—Ala—Phe—Val—OH with about a 0.5 molar excess of DCC in the presence of 0.5 to 1.0 molar excess of N-hydroxysuccinimide or N-hydroxybenzotriazole. Convenient conditions for this reaction include the use of dimethylformamide as solvent with the temperature ranging from 0° to 25°C and the reaction time ranging from 2 to 24 hours.

Finally the preceding protected hexapeptide derivative is treated with a deprotecting agent, for example, trifluoroacetic acid, in the aforementioned described manner to yield the corresponding peptide derivative of formula 1, H—Ala—Phe—Val—Gly—N[N($R^1$)($R^2$)]CH$R^3$CO—CH(CH$_2$CH$_2$SCH$_3$)CONH$_2$ in which $R^1$, $R^2$ and $R^3$ are as defined herein.

The following examples illustrate further this invention.

EXAMPLE 1

Isobutyraldehyde Dimethyl Hydrazone

A solution of isobutyraldehyde (43 g, 0.6 mole) and dimethylhydrazine (60 g, 1.0 mole) in benzene (500 ml) is heated at reflux temperature for 5 hr. using a Dean-Stark apparatus to collect the water. The solution is evaporated and the residue fractionally distilled. The hydrazone is obtained as a yellow oil, b.p. 120°C, $\nu_{max}^{film}$ 1610, 1475, 1450 cm$^{-1}$.

In the same manner but replacing isobutyraldehyde with an equivalent amount of isovaleraldehyde, isovaleraldehyde dimethyl hydrazone, b.p. 145°–149°C. is obtained.

In the same manner but replacing isobutyraldehyde with an equivalent amount of phenylacetaldehyde and replacing the dimethylhydrazine with an equivalent amount of diethylhydrazine, phenylacetaldehyde diethyl hydrazone is obtained.

In the same manner but replacing isobutyraldehyde with an equivalent amount of indole-3-acetaldehyde and replacing dimethylhydrazine with dipropylhydrazine, indole-3-acetaldehyde dipropyl hydrazone is obtained.

EXAMPLE 2

N-(t-Butoxycarbonyl)phenylalanyl[N-(dimethylamino)-DL-valyl]glycine ethyl ester (2; $R^1$ and $R^2$ = CH$_3$, $R^3$ = CH(CH$_3$)$_2$, $R^4$ = Boc-Phe and $R^5$ = CH$_2$COOC$_2$H$_5$)

Isobutyraldehyde dimethyl hydrazone (6.0 g, 0.043 mole), described in Example 1, and ethyl isocyanoacetate (5.6 g, 0.043 mole) are dissolved in freshly distilled methylene chloride (25 ml). Hydrated alkali-aluminum silicate (Molecular Sieves No. 4, 10.0 g) is added. The mixture is stirred at 0°C. N-(t-Butoxycarbonyl)-phenylalanine (13.6 g, 0.44 mole) in methylene chloride (50 ml) is added dropwise and the mixture stirred at room temperature for 72 hr. The reaction mixture is then filtered, the filtrate extracted with ammonium hydroxide (4N, 140 ml) and the aqueous phase extracted three times with methylene chloride (250 ml). The organic extracts are backwashed three times with sodium chloride solution, dried (MgSO$_4$) and evaporated under reduced pressure. The crude product is subjected to chromatography on silica gel with ethyl acetate-benzene (2:5) as solvent. Two isomeric compounds of the title compound are eluted:

Isomer L, $[\alpha]_D^{25}$ = – 66.9° (CHCl$_3$), nmr (CDCl$_3$) δ 0.91 and 1.04 (2 × d, J = 6.5, 6H), 1.29 (+, J = 7, 3H), 1.42 (s, 9H), 2.3 and 2.6 (2 × s, 6H), 3,2 (m, 1H), 4.0 (d, J = 6, 2H), 4.2 (2H), 5.35 (m, 2H).

Isomer M, $[\alpha]_D^{24}$ = + 40.0° (CHCl$_3$), nmr (CDCl$_3$) δ 0.75 and 1.03 (2 × d, 6H), 1.28 (+, j = 7, 3H), 1.36 (s, 9H), 2.42 and 2.63 (2 × s, 6H), 3.20 (m, 1H), 3.98 (d, j = 6, 2H), 4.2 (2H), 5.25 (m, 2H).

In the same manner but replacing isobutyraldehyde dimethyl hydrazone with an equivalent amount of isovaleraldehyde dimethyl hydrazone, then N-(t-butoxycarbonyl)phenylalanyl[N-(dimethylamino)-DL-leucyl]glycine ethyl ester is obtained.

In the same manner but replacing isobutyraldehyde dimethyl hydrazone with an equivalent amount of phenylacetaldehyde diethyl hydrazone, then N-(t-butoxycarbonyl)phenylalanyl[N-(diethylamino)-DL-phenylalanyl]glycine ethyl ester is obtained.

In the same manner but replacing isobutyraldehyde dimethyl hydrazone with an equivalent amount of indole-3-acetaldehyde dipropyl hydrazone, N-(t-butoxycarbonyl)phenylalanyl[N-(dipropylamino)-DL-tryptophyl]glycine ethyl ester is obtained.

EXAMPLE 3

N-(t-Butoxycarbonyl)phenylalanyl[N-(dimethylamino)-DL-valyl]glycylleucylmethioninamide (Boc—Phe—N[N(CH$_3$)$_2$]—CH[CH(CH$_3$)$_2$]CO—Gly—Leu—Met—NH$_2$)

The intermediate of formula 11, N-(t-butoxycarbonyl)phenylalanyl[N-(dimethylamino)-DL-valyl]glycine ethyl ester (Isomer M, 1.248 g, 2.54 mmole), is dissolved in methanol and aqueous sodium hydroxide (3.17 ml, 1N) is added with stirring at 0°C. Stirring is continued for 14 hr. at 0°C., then aqueous HCl (3.22 ml, 1N) is added. The reaction mixture is extracted with ethyl acetate (3 × 50 ml). The organic layers are backwashed with satd NaCl solution, dried (MgSO$_4$) and evaporated to give the acid of formula Boc—Phe—N[N(CH$_3$)($_2$)CH[CH(CH$_3$)$_2$]CONHCH$_2$COOH (Isomer M).

The latter acid (1.18 g) and p-nitrophenol (0.429 g., 3 mmole) are stirred with ethyl acetate (15 ml) at 0°C. DCC (0.540 g; 2.6 mmole) is added and stirring continued for 30 min. at 0°C. and 4 hr. at room temperature. The dicyclohexylurea is collected on a filter, washed with ethyl acetate and the combined filtrates evaporated to give the corresponding activated ester, N-(t-butoxycarbonyl)phenylalanyl[N-(dimethylamino)-DL-valyl]glycine p-nitrophenyl ester (Isomer M).

The latter activated ester and H—Leu—Met—NH$_2$ (0.662 g, 2.54 mmole), described by P. H. Bentley, et al., J. Chem. Soc., 6130 (1964), are dissolved in dry dimethylformamide (3.2 ml) containing one drop of acetic acid and left 18 hr. at 0°C. and 4 hr. at room temperature. The reaction mixture is poured into a mixture of ice and water (50 ml) and extracted with ethyl acetate (3 × 100 ml). The organic layers are washed with water (10 × 50 ml) dried and evaporated. The crude residue is chromatographed on silica gel with ethyl acetate-methanol-pyridine (200:4:1) to yield the pure title compound. Crystallization from methanol isopropyl ether gives the title compound (Isomer M) with m.p. 100°-118°C. The compound retains isopropyl ether after long drying periods. Crystallization from methanol-ether affords the pure title compound (Isomer M) m.p. 100°-108°C., [α]$_D^{25}$ = + 7.0° (DMF).

In the same manner but using the corresponding Isomer L of the preceding intermediate of formula 11 in the procedure of this example, the corresponding Isomer L of the title compound, m.p. 117°-120°C. after recrystallization from methanol-isopropyl ether, [α]$_D^{25}$ = − 66.4 (DMF), is obtained.

In the same manner but replacing N-(t-butoxycarbonyl)-phenylalanyl[N-(dimethylamino)-DL-valyl]glycine ethyl ester with an equivalent amount of N-(t-butoxycarbonyl)phenylalanyl[N-(dimethylamino)-DL-leucyl]glycine ethyl ester, N-(t-butoxycarbonyl)phenylalanyl[N-(dimethylamino)-DL-leucyl]glycylleucylmethioninamide is obtained.

In the same manner but replacing N-(t-butoxycarbonyl)-phenylalanyl[N-(dimethylamino)-DL-valyl]glycine ethyl ester with an equivalent amount of N-(t-butoxycarbonyl)phenylalanyl[N-(diethylamino)-DL-phenylalanyl]glycine ethyl ester, N-(t-butoxycarbonyl)phenylalanyl[N-(diethylamino)-DL-phenylalanyl]glycylleucylmethioninamide is obtained.

In the same manner but replacing N-(t-butoxycarbonyl)phenylalanyl[N-(dimethylamino)-DL-valyl]glycine ethyl ester with an equivalent amount of N-(t-butoxycarbonyl)phenylalanyl[N-(dipropylamino)-DL-tryptophyl]glycine ethyl ester, N-(t-butoxycarbonyl)phenylalanyl[N-(dipropylamino)-DL-tryptophyl]glycylleucylmethioninamide is obtained.

EXAMPLE 4

Alanylphenylalanyl[N-(dimethylamino)-DL-valyl]glycylleucylmethioninamide [1; A = H—Ala—Phe, B = Gly — Leu — NH$_2$, R$^1$ and R$^2$ = CH$_3$ and R$^3$ = CH(CH$_3$)$_2$]

The protected pentapeptide derivative, Isomer L of the title compound of Example 3 (726 mg, 1 mmole), is stirred under nitrogen with 5 ml of methanol containing anhydrous HCl (5N) at 0°C. for 2 hr. The solvent is then removed under reduced pressure and the residue dried overnight at high vacuum. The solid is dissolved in 10 ml dimethylformamide containing triethylamine (0.14 ml) at 0°C. N-(t-butoxycarbonyl)alanine 2,4,5-trichlorophenol ester (368 mg, 1 mmole) is added and the mixture left for 3 days at 0°C. The reaction mixture is then added dropwise to cold, stirred water (100 ml). The precipitate is collected by filtration and dried at high vacuum. The dried precipitate is dissolved in methylene chloride and precipitated again with cold ether to give N-(t-butoxycarbonyl)alanylphenylalanyl[N-(dimethylamino)-DL-valyl]glycylleucylmethioninamide (Isomer L) m.p. 118°-127°C., [α]$_D^{25}$ − 57.7° (DMF).

The latter compound (6500 mg) is stirred under nitrogen with 5 ml. of methanol containing anhydrous HCl (5N) at 0°C. for 2 hr. Evaporation of the solvent and drying of the residue overnight under reduced pressure affords the title compound in the form of its hydrochloride addition salt, which is transformed to its corresponding free base by chromatography on silical gel using methanol-chloroform (1:7). The free base gives the following amino acid analysis:

| | |
|---|---|
| Glycine | 1.09 |
| Alanine | 1.07 |
| Methionine | 0.95 |
| Leucine | 1.06 |
| Phenylalanine | 0.87 |

N-(t-Butoxycarbonyl)alanine 2,4,5-trichlorophenol ester is described by E. Sandrin and R. A. Boissonnas, Helv. Chim. Acta, 46, 1637 (1963).

In the same manner but using the corresponding Isomer M of the title compound of Example 3 in the procedure of this example, the corresponding Isomer M of N-(t-butoxycarbonyl)phenylalanyl[N-(dimethylamino)-DL-valyl]glycylleucylmethioninamide, m.p. 179°-183°C., [α]$_D^{25}$ − 7.0° (DMF) is obtained. The latter compound is deprotected and converted to its corresponding free base (title compound) in the same manner as the above Isomer L. This Isomer M gives the following amino acid hydrolysis:

| | |
|---|---|
| Glycine | 1.13 |
| Alanine | 1.07 |
| Methionine | 0.89 |
| Leucine | 1.03 |
| Phenylalanine | 0.83 |

In the same manner but replacing the protected pentapeptide used above in this example with the protected peptide, N-(t-butoxycarbonyl)phenylalanyl[N-(dimethylamino)DL-leucyl]glycylleucylmethioninamide, alanylphenylalanyl[N-(dimethylamino)-DL-leucyl]glycylleucylmethioninamide is obtained.

In the same manner but replacing the protected pentapeptide used above in this example with the protected peptide, N-(t-butoxycarbonyl)phenylalanyl[N-(diethylamino)-DL-phenylalanyl]glycylleucylmethioninamide, alanylphenylalanyl[N-(diethylamino)-DL-phenylalanyl]glycylleucylmethioninamide is obtained.

In the same manner but replacing the protected pentapeptide used above in this example with the protected peptide, N-(t-butoxycarbonyl)phenylalanyl[N-(dipropylamino)-DL-tryptophyl]glycylleucylmethioninamide, alanylphenylalanyl[N-(dipropylamino)-DL-tryptophyl]glycylleucylmethioninamide is obtained.

EXAMPLE 5

2-Isocyano-4-methylthiobutyric Acid Ethyl Ester

A solution of phosgene (2.48 g, 25.0 mmole) in dry methylene chloride (23 ml) is added dropwise to a stirred solution of N-formylmethionine ethyl ester (4.47 g, 21.8 mmole), described in German Pat. No. 1,201,357, issued Sept. 23, 1965 [Chem. Abstr., 63, 18260 (1965)], and 1-methylmorpholine (7.4 ml, 65.4 mmole) in dry methylene chloride (20 ml) at −25°C over a 30 min. period. The mixture is stirred for another 30 min. and then filtered. The filtrate is concentrated under reduced pressure at room temperature. Benzene (50 ml) is added and the mixture filtered. The filtrate is fractionally distilled to afford the title compound, b.p. 77°–79°C/0.1 mm., $\nu_{max}$CHCl$_3$ 2142, 1739 cm$^{-1}$.

EXAMPLE 6

N-(t-Butoxycarbonyl)glycyl[N-(dimethylamino)-DL-leucyl]-DL-methionine ethyl ester (2; R$^1$ and R$^2$ = CH$_3$, R$^3$ = CH$_2$CH(CH$_3$)$_2$, R$^4$ = Boc-Gly and R$^5$ = CH(CH$_2$CH$_2$SCH$_3$)—COOC$_2$H$_5$ A solution of isovaleraldehyde dimethylhydrazone (2.93 g, 22.8 mmole), 2-isocyano-4-methylthiobutyric acid ethyl ester (4.28 g, 22.8 mmole), and N-(t-butoxycarbonyl)glycine (4.0 g, 22.8 mmole) in dry methylene chloride (20 ml) is stirred at room temperature for 60 hr. The solution is diluted with methylene chloride (100 ml), and washed with 0.5 N ammonium hydroxide (100 ml), water (100 ml), and saturated sodium chloride solution (100 ml). The organic solution is dried (Na$_2$SO$_4$) and concentrated. The yellow oil is subjected to chromatography on a column of silica gel (800 g) and eluted with ethyl acetate-benzene-pyridine (45:55:1) to afford the title compound, nmr (CDCl$_3$) δ 0.98 (d, J = 5, 6H), 1.26 (2 × t, J = 7, 3H), 1.46 (9H), 2.11 (2 × s, 3H), 2.56 (6H).

In the same manner but replacing isovaleraldehyde dimethyl hydrazone with an equivalent amount of isobutyraldehyde dimethyl hydrazone, N-(t-butoxycarbonyl)glycyl[N-(dimethylamino)-DL-valyl]-DL-methionine ethyl ester is obtained.

In the same manner but replacing isovaleraldehyde dimethyl hydrazone with an equivalent amount of phenylacetaldehyde dimethyl hydrazone, N-(t-butoxycarbonyl)glycyl[N-(dimethylamino)-DL-phenylalanyl]-DC-methionine ethyl ester is obtained.

In the same manner but replacing isovaleraldehyde dimethyl hydrazone with an equivalent amount of indole-3-acetaldehyde dipropyl hydrazone, N-(t-butoxycarbonyl)glycyl[N-(dipropylamino)-DL-tryptophyl]-DL-methionine ethyl ester is obtained.

EXAMPLE 7

N-(t-Butoxycarbonyl)glycyl[N-(dimethylamino)-DL-leucyl]-DL-methioninamide (2; R$^1$ and R$^2$ = CH$_3$, R$^3$ = CH$_2$CH(CH$_3$)$_2$, R$^4$ = Boc — Gly and R$^5$ = CH—(CH$_2$CH$_2$SCH$_3$)CONH$_2$)

A solution of (N-t-butoxycarbonyl)glycyl[N-(dimethylamino)-DL-leucyl]-DL-methionine ethyl ester (6.7 g, 13.8 mmole) in anhydrous methanol (250 ml), previously saturated with ammonia at 0°C., is stirred at 0°C. for 44 hr. The solvent is removed under reduced pressure. The residue is subjected to chromatography on a column of silica gel (600 g) using (75:25:1) ethyl acetate-chloroform-pyridine as the eluting solvent. The title compound is obtained as two isomeric compounds. The less polar compound is crystallized from ethyl acetate as fine white needles, m.p. 84°–89°C., $[\alpha]_D^{25}$ + 0.5° (CHCl$_3$); nmr (CDCl$_3$) δ 1.00 (d, J = 5, 6H) 1.46 (9H), 2.1 (3H), 2.6 (6H). The more polar compound is crystallized from isopropyl ether as white prisms, m.p. 80°–90°C., $[\alpha]_D^{25}$ + 0.8° (CHCl$_3$); nmr (CDCl$_3$) δ 1.12 (d, J = 6.5, 6H), 1.45 (9H), 2.60 (3H), 2.55 (6H).

The less polar isomer is designated Isomer M and the more polar isomer is designated Isomer L.

In the same manner but replacing N-(t-butoxycarbonylglycyl[N-(dimethylamino)-DL-leucyl]-DL-methionine ethyl ester with an equivalent amount of N-(t-butoxycarbonyl)glycyl[N-(dimethylamino)-DL-valyl]-DL-methionine ethyl ester N-(t-butoxycarbonyl)glycyl[N-(dimethylamino)-DL-valyl]-DL-methioninamide is obtained.

In the same manner but replacing N-(t-butoxycarbonyl)glycyl[N-(dimethylamino)-DL-leucyl]-DL-methionine ethyl ester with an equivalent amount of N-(t-butoxycarbonyl)glycyl[N-(diethylamino)-DL-phenylalanyl]-DL-methionine ethyl ester, N-(t-butoxycarbonyl)glycyl[N-(diethylamino)-DL-phenylanyl]-DL-methioninamide is obtained.

In the same manner but replacing NN-(t-butoxycarbonyl)glycyl[N-(dimethylamino)-DL-leucyl]-DL-methionine ethyl ester with an equivalent amount of N-(t-butoxycarbonyl)-glycyl[N-(dipropylamino)-DL-tryptophyl]-DL-methionine ethyl ester, N-(t-butoxycarbonyl)glycyl[N-(dipropylamino)-DL-tryptophyl]-DL-methioninamide is obtained.

EXAMPLE 8

Alanylphenylalanylvalylglycyl[N-(dimethylamino)-DL-leucyl]-DL-methioninamide [1; A = H—Ala—Phe—Val—Gly, B = NHHCH(CH$_2$CH$_2$SCH$_3$)CONH$_2$, R$^1$ and R$^2$ = CH$_3$ and R$^3$ = CH$_2$CH(CH$_3$)$_2$]

A solution of N-(t-butoxycarbonyl)glycyl[N-(dimethylamino)-DL-leucyl]-DL-methioninamide (1.0 g, 2.17 mmole, Isomer L) in trifluoroacetic acid (10 ml) is stirred at 0°C. for 30 min. The solvent is removed under reduced pressure at room temperature. The residue is triturated with ether (2 × 10 ml) and the insoluble residue is crystallized from methanol-isopropyl ether to give glycyl[N-(dimethylamino)-DL-leucyl]-DL-methioninamide (Isomer L) in the form of its trifluoroacetic acid addition salt, m.p. 184°C.

A solution of DCC (0.314 g, 1.74 mmole) in dimethyl formamide (DMF, 5 ml) is added to a solution of N-(t-butoxycarbonyl)alanylphenylalanylvaline (0.504 g, 1.16 mmole), described by G. Onofrio, et al., Gazz. Chim. Ital., 94, 172 (1964), N-hydroxysuccinamide (0.267 g, 2.32 mmole) and the trifluoroacetic acid addition salt of glycyl[N-(dimethylamino)-DL-leucyl]-DL-methioninamide (Isomer L, 0.550 g, 1.16 mmole), obtained as described above, in DMF (6 ml) and triethylamine (0.16 ml) at 0°C. The mixture is stirred at 0°C. for 2 hr. and then at room temperature for 18 hr. The mixture is filtered. The filtrate is concentrated to dryness and the residue is chromatographed on silica gel (100 g) using methanol-chloroform-pyridine (10:90:1), to give N-(t-butoxycarbonyl)alanylphenylalanylvalylglycyl[N-(dimethylamino)-DL-leucyl]-DL-methioninamide.

The latter compound (0.779 g, 1.0 mmole) in trifluoroacetic acid (10 ml) is stirred at 0°C. for 30 min. The solvent is removed under reduced pressure at 25°C. The residue is triturated with ether (2 × 25 ml) and the insoluble residue is chromatographed on silica gel (200 g) using methanol-chloroform (1:7). Evaporation of the eluate affords Isomer L of the title compound Anal. Calcd for $C_{32}H_{54}N_8O_6S$: C, 56.61; H, 8.01; N, 16.50%. Found: C, 55.95; H, 8.00; N, 16.40%.

Amino Acid Anal.

| Glycine | 0.85 | Methionine | 0.90 |
|---|---|---|---|
| Alanine | 1.07 | Leucine | 0.49 |
| Valine | 1.15 | Phenylalanine | 1.09 |

In the same manner but using the corresponding Isomer M of N-(t-butoxycarbonyl)glycyl[N-(dimethylamino)-DL-leucyl]-DL-methioninamide in the procedure of this example, there is obtained the corresponding Isomer M of the title compound:

Anal. Calcd for $C_{32}H_{54}N_8O_6S$: C, 56.61; H, 8.01; N, 16.50%. Found: C, 55.89; H, 7.97; N, 16.42%.

Amino Acid Anal.

| Glycine | 0.91 | Methionine | 0.88 |
|---|---|---|---|
| Alanine | 1.08 | Leucine | 0.50 |
| Valine | 1.12 | Phenylalanine | 1.05 |

In the same manner but replacing N-(t-butoxycarbonyl)-glycyl[N-(dimethylamino)-DL-leucyl]-DL-methioninamide with an equivalent amount of N-(t-butoxycarbonyl)glycyl[N-(dimethylamino-DL-valyl]-DL-methioninamide, alanylphenylalanylvalylglycyl[N-(dimethylamino)-DL-valyl]-DL-methioninamide is obtained.

In the same manner but replacing N-(t-butoxycarbonyl)-glycyl N-(dimethylamino)-DL-leucyl]-DL-methioninamide with an equivalent amount of N-(t-butoxycarbonyl)glycyl[N-(diethylamino)-DL-phenylalanyl]-DL-methioninamide, alanylphenylalanylvalylglycyl[N-(diethylamino)-DL-phenylalanyl]-DL-methioninamide is obtained.

In the same manner but replacing N-(t-butoxycarbonyl)glycyl[N-(dimethylamino)-DL-leucyl]-DL-methioninamide with an equivalent amount of N-(t-butoxycarbonyl)glycyl[N-(dipropylamino)-DL-tryptophyl]-DL-methioninamide, alanylphenylalanylvalylglycyl[N-(dipropylamino)-DL-tryptophyl]-DL-methioninamide is obtained.

We claim:
1. A compound of formula 1

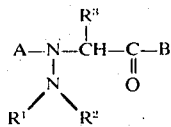

in which $R^1$ and $R^2$ each are lower alkyl, $R^3$ is an amino acid side chain, A is the acyl component of an amino acid or peptide and B is the amino component of a second amino acid or peptide having up to four amino acid units.

2. A compund of the formula 1

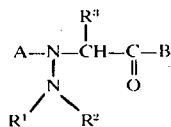

in which $R^1$ and $R^2$ each are lower alkyl, $R^3$ is an amino acid side chain, and A is H—Ala—Phe— and B is —Gly—Leu—Met—NH$_2$ or A is H—Ala—Phe—Val—Gly— and B is —NHCH(CH$_2$CH$_2$SCH$_3$)CONH$_2$, as claimed in claim 1.

3. A pharmaceutically acceptable acid addition salt of the compound of formula 1 as claimed in claim 1.

4. The corresponding t-butoxycarbonyl derivative of the compound of formula 1 as claimed in claim 1.

5. Alanylphenylalanyl[N-(dimethylamino)-DL-valyl]-glycylleucylmethioninamide.

6. Alanylphenylalanylvalylglycyl[N-(dimethylamino)DL-leucyl]-DL-methioninamide.

7. N-(t-Butoxycarbonyl)alanylphenylalanyl[N-(dimethylamino)-DL-valyl]glycylleucylmethioninamide.

8. N-(t-Butoxycarbonyl)alanylphenylalanylvalylglycyl[N-(dimethylamino)-DL-leucyl]-DL-methioninamide.

9. A compound of the formula 2

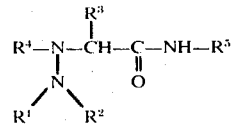

in which $R^1$ and $R^2$ each are lower alkyl, $R^3$ is an amino acid side chain, and $R^4$ is Boc—Phe— and $R^5$ is —CH$_2$COOR$^6$ wherein $R^6$ is lower alkyl or $R^4$ is Boc—Gly— and $R^5$ is —CH(CH$_2$CH$_2$SCH$_3$)COOR$^6$ wherein $R^6$ is lower alkyl.

10. N-(t-Butoxycarbonyl)phenylalanyl[N-(dimethylamino)-DL-valyl]glycine ethyl ester.

11. N-(t-Butoxycarbonyl)glycyl[N-(dimethylamino)-DLleucyl]-DL-methionine ethyl ester.

12. N-(t-Butoxycarbonyl)phenylalanyl[N-(dimethylamino)-DL-valyl]glycylleucylmethioninamide.

13. N-(t-Butoxycarbonyl)glycyl[N-(dimethylamino)-DL-leucyl]-DL-methioninamide.

* * * * *

UNITED STATES PATENT AND TRADEMARK OFFICE
CERTIFICATE OF CORRECTION

PATENT NO. : 3,904,593
DATED : September 9, 1975
INVENTOR(S) : Drs. Immer, Nelson and Gotz It is certified that error appears in the above-identified patent and that said Letters Patent are hereby corrected as shown below:

Abstract, for "Gly-N[N($R^1$)($R^2$)]CH$R^3$CONHCH(CH$_2$CH$_2$3-"
read -- Gly-N[N($R^1$)($R^2$)]CH$R^3$CONHCH(CH$_2$CH$_2$SCH$_3$- --, read -- Phe-N[N($R^1$)($R^2$)]CH$R^3$CO- --, Column 9, line 38, for "Phe-Va - " read -- Phe-Val --, Column 10, line 41, for "tatebenzene" read -- tate-benzene --, Column 10, line 44, for "(+, J = 7, 3H)," read --(t, J=7, 3H),--, Column 10, line 48, for "(+, J = 7, 3H)," read --(t, J=7, 3H),--, Column 11, line 41, for "methanol isopropyl" read
--methanol-isopropyl --, Column 14, line 2, for "phenylalanyl]-DC-methionine" read
--phenylalanyl]-DL-methionine --, Column 14, line 49, for "NN-(t-" read --N-(t- --and Column 14, line 61, for "NHHCH(CH$_2$CH$_2$SCH$_3$)CONH$_2$" read
--NHCH(CH$_2$CH$_2$SCH$_3$)CONH$_2$ --, Column 16, line 62, Claim 11, for "DLleucyl]" read
--DL-leucyl]--.

Signed and Sealed this ninth Day of March 1976

[SEAL]

Attest:

RUTH C. MASON
Attesting Officer

C. MARSHALL DANN
Commissioner of Patents and Trademarks